UNITED STATES PATENT OFFICE.

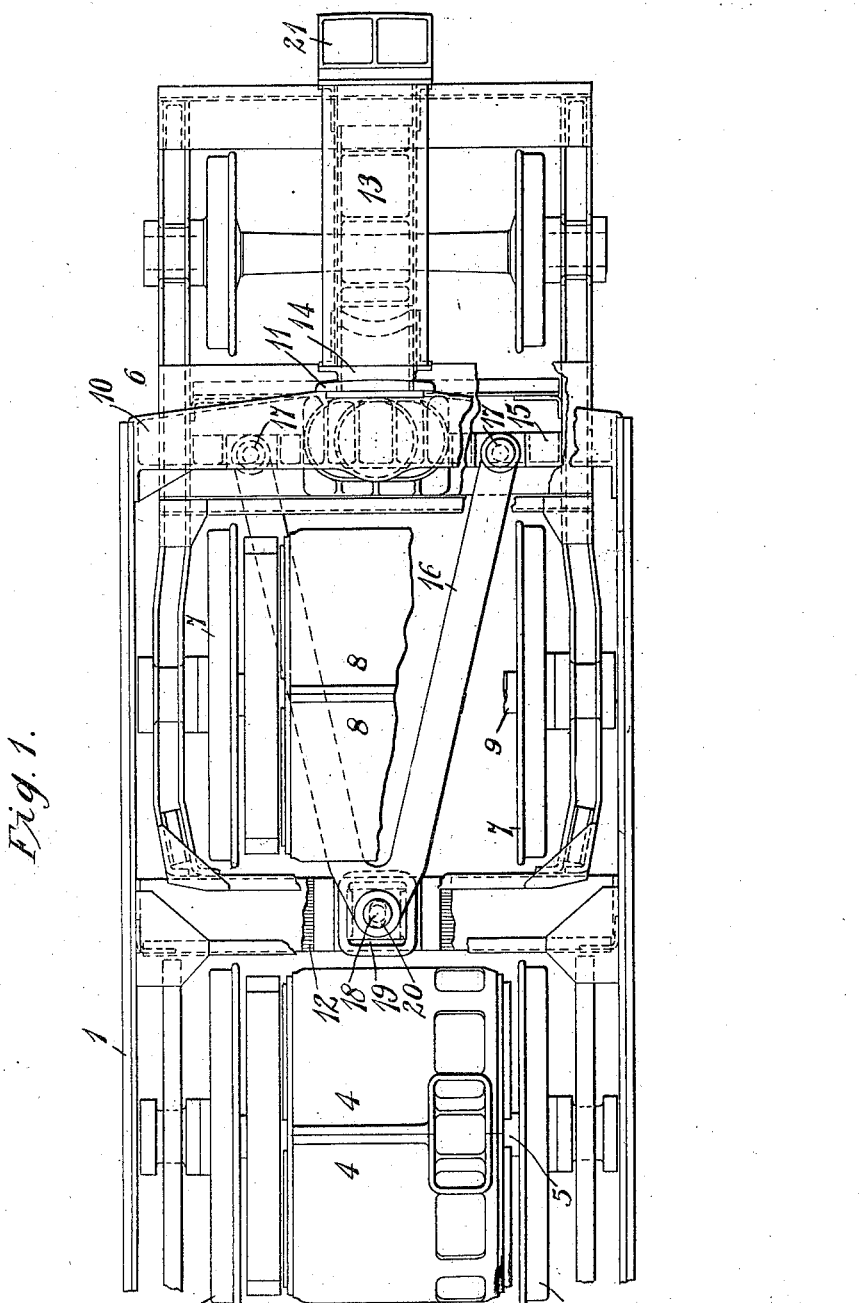

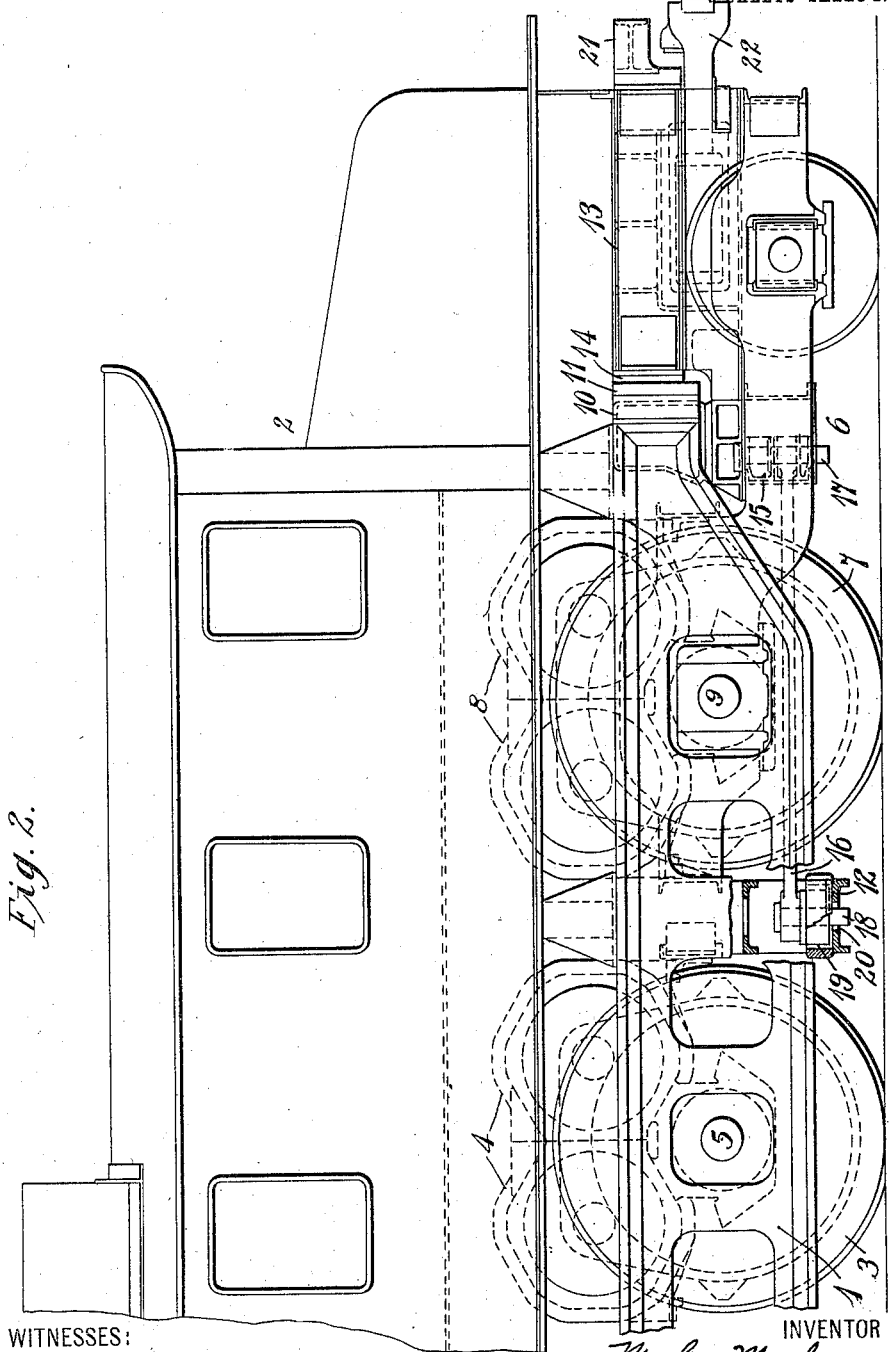

MYLES MAHONEY, OF WILKINSBURG, PENNSYLVANIA, ASSIGNOR TO WESTINGHOUSE ELECTRIC AND MANUFACTURING COMPANY, A CORPORATION OF PENNSYLVANIA.

RAILWAY-LOCOMOTIVE.

1,078,631.  Specification of Letters Patent.  Patented Nov. 18, 1913.

Application filed March 20, 1911.  Serial No. 615,537.

*To all whom it may concern:*

Be it known that I, MYLES MAHONEY, a subject of the King of Great Britain, and a resident of Wilkinsburg, in the county of Allegheny and State of Pennsylvania, have invented a new and useful Improvement in Railway-Locomotives, of which the following is a specification.

My invention relates to railway locomotives and more especially to such locomotives as are equipped with and propelled by electric motors, though not necessarily restricted, as regards all of the features, to locomotives propelled by electric power.

The object of my invention is to provide a locomotive having a centrally located truck constituting a rigid wheel base and a four-wheel radial truck at each end thereof which shall be so designed and constructed with reference to the locomotive frame that the locomotive may follow the track with a minimum amount of wear and danger of derailment and in which the draft connections between the radial trucks and the locomotive frame shall be free from compression strains when such radial trucks are subjected to a pushing or a bumping action.

In the accompanying drawing, Figure 1 is a plan view of substantially one-half of the truck structure of a locomotive constructed in accordance with my invention, parts being broken away, and Fig. 2 is a side elevation of substantially one-half of a locomotive constructed in accordance with my invention, parts being broken away and in section.

The main frame 1 of the locomotive may be of usual construction and is provided with a body or cab 2, in accordance with the usual practice. Mounted above each pair of main truck wheels 3, constituting the rigid wheel base, only one of which is shown, is a pair of propelling electric motors 4 which may be suitably geared to the wheels 3 or wheel axles 5 and beneath each end of the cab and main locomotive frame is mounted a four-wheel truck 6, the larger pair of wheels 7 of which correspond in size and general arrangement to the main wheels 3 constituting the rigid wheel base, and above these are mounted a pair of electric motors 8 which may be geared to the wheels 7 or their axle 9 in any suitable well known manner. The end beam 10 of the main truck frame is provided with an end piece 11, the outer face of which is convex, the radius of curvature having its center in a cross tie 12 located between the larger wheels of the radial truck and the adjacent wheels 3 of the main truck.

A central longitudinal beam 13 of the frame of the radial truck is provided with a plate 14 having a concave face which corresponds in curvature to that of the end piece 11. In order that the two adjacent surfaces may have free relative movement as the radial truck moves circumferentially in accordance with the curvature of the truck, the truck is provided with a cross beam 15 between its smaller and larger wheels and beneath the end beam 10 of the main frame, and to this beam 15, are pivotally attached the ends of a triangular shaped radius frame or bar 16 by means of pins 17. The rear end of the radius bar or frame 16 is pivotally attached to the cross tie 12 by means of a pin 18, the axis of which is the center of the radius of curvature of the faces of the plates 11 and 14. Connection between the pin 18 and the cross tie 12 is effected by means of a block 19 and a socket 20 in which the block has a limited degree of movement lengthwise of the truck. It will be understood that, by reason of the lost motion afforded by the construction just referred to, under normal operating conditions of a locomotive, there will be a slight degree of separation between the end piece 11 and the plate 14 and the radial truck will be free to move with reference to the rigid wheel base, within reasonable limits. In case of a pushing or a bumping action against the part 21 or the draw bar 22 of the locomotive, by reason of engagement with another railway vehicle or a stationary bumper, end piece 11 of the main frame will receive the impact and thus relieve the radius frame and the coöperating parts from compression strains.

I claim as my invention:

1. In a locomotive, the combination with a main truck having a rigid wheel base and a propelling motor, of a four-wheel end truck having a propelling motor, a radius bar or frame pivotally connected to said main truck, and means for relieving said radius bar or frame from longitudinal compression strains.

2. In a locomotive, the combination with a main truck having a rigid wheel base and a propelling motor, of a four-wheel end truck having a propelling motor, a radius bar or frame pivotally connected to said main truck and having also a lost-motion connection therewith, and means for positively limiting the lost motion between the main truck frame and the end truck frame.

3. In a locomotive, the combination with a main truck having a rigid wheel base and a convex bearing block at the end of its frame, of a four-wheel end truck having a concave bearing block on its frame to engage the convex bearing block of the main truck frame, and a radius bar or frame interposed between cross bars of the two truck frames and having a single lost-motion connection with the main truck frame.

4. In a locomotive, the combination with a motor equipped main truck having side frames and a cross beam having an automatically adjustable center block, of a motor-equipped end truck, and a radius bar or frame pivotally connected to said end truck and to the center block of the main truck.

5. In a locomotive, the combination with a motor-equipped main truck having an end bearing block, of a motor-equipped end truck having an end bearing block to engage the main truck bearing block, and a radius bar interposed between said trucks and having a lost-motion connection with one of them.

In testimony whereof, I have hereunto subscribed my name this 14th day of March, 1911.

MYLES MAHONEY.

Witnesses:
R. J. DEARBORN.
B. B. HINES.